(12) United States Patent
Bi et al.

(10) Patent No.: US 7,839,776 B2
(45) Date of Patent: Nov. 23, 2010

(54) DETECTING A REVERSE RATE INDICATOR CHANNEL

(75) Inventors: Qi Bi, Morris Plains, NJ (US); Dongzhe Cui, Parsippany, NJ (US); Yifei Yuan, Livingston, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 993 days.

(21) Appl. No.: 11/385,611

(22) Filed: Mar. 21, 2006

(65) Prior Publication Data

US 2007/0226491 A1   Sep. 27, 2007

(51) Int. Cl.
*G01R 31/08* (2006.01)
*H04J 4/00* (2006.01)
(52) U.S. Cl. ........................ 370/230; 370/478
(58) Field of Classification Search .......... 713/160; 370/265, 329–330, 338, 348, 465, 470–477
See application file for complete search history.

(56) References Cited

U.S. PATENT DOCUMENTS

| | | | |
|---|---|---|---|
| 6,804,220 B2* | 10/2004 | Odenwalder et al. | 370/337 |
| 2002/0103953 A1* | 8/2002 | Das et al. | 710/105 |
| 2003/0053435 A1* | 3/2003 | Sindhushayana et al. | 370/342 |
| 2004/0083361 A1* | 4/2004 | Noble et al. | 713/160 |
| 2004/0141460 A1* | 7/2004 | Holtzman et al. | 370/216 |
| 2004/0179480 A1* | 9/2004 | Attar et al. | 370/252 |
| 2005/0007986 A1* | 1/2005 | Malladi et al. | 370/342 |
| 2005/0018610 A1* | 1/2005 | Kim et al. | 370/236 |
| 2006/0039344 A1* | 2/2006 | Khan | 370/345 |
| 2006/0126492 A1* | 6/2006 | Hyun et al. | 370/208 |
| 2006/0193351 A1* | 8/2006 | Kim et al. | 370/538 |

OTHER PUBLICATIONS

3PP2 C.S0024-A, "CDMA2000 High Rate Packet Data Air Interface Specification" *Version 2.0 Third Generation Partnership Project 2*, 3 pages, Jul. 25, 2005.

* cited by examiner

*Primary Examiner*—Gilberto Barron, Jr.
*Assistant Examiner*—David Le
(74) *Attorney, Agent, or Firm*—Williams, Morgan & Amerson

(57) ABSTRACT

The present invention provides a method for detecting a reverse rate indicator channel. The method may include accessing first encoded information indicative of a data rate and a first sub-packet identifier associated with a sub-packet, accessing second encoded information indicative of the data rate and a second sub-packet identifier associated with the sub-packet, and modifying the second encoded information. The method may also include combining the first encoded information and the modified second encoded information, and decoding the combined first and modified second encoded information.

20 Claims, 3 Drawing Sheets

DETECTING A REVERSE RATE INDICATOR CHANNEL

BACKGROUND OF THE INVENTION

1. Field of the Invention

This invention relates generally to communication systems, and, more particularly, to wireless communication systems.

2. Description of the Related Art

In conventional wireless telecommunications, one or more mobile units (or access terminals) may establish a mobile communication path through a wireless communication link to a base station, which may also be referred to as a radio access network (RAN). A typical wireless communication link includes numerous uplink and downlink channels between the mobile units and the base station. For example, the wireless communication link may include uplink and downlink traffic channels for carrying data packets between the mobile unit and the base station, as well as uplink and downlink signaling channels for transmitting signaling information between the mobile unit and the base station. Signaling information typically includes information used to configure the mobile unit and/or the base station, as well as information used to maintain, operate, and/or modify the characteristics of one or more of the channels associated with the wireless communication link.

The channels of the wireless communication link are established according to one or more protocols, such as code division multiple access (CDMA), time division multiple access (TDMA), frequency division multiple access (FDMA), and the like. For example, Evolution, Data-Optimized (EV-DO) wireless communication systems combine features of CDMA and TDMA protocols to enhance overall system capacity. An EV-DO wireless communication system also implements other enhancements such as adaptive modulation and/or coding, incremental redundancy using the Hybrid Acknowledgment Request (H-ARQ) technique, and multiple high data transmission rates. Consequently, the signaling channels in an EV-DO wireless communication system may be used to provide information associated with the adaptive modulation and/or coding, incremental redundancy, data transmission rates, and the like.

One of the signaling channels implemented in a conventional EV-DO wireless communication system is a reverse rate indicator channel that provides information for implementing incremental redundancy and multiple data transmission rates. The reverse rate indicator channel is used to transmit information from the mobile unit to the base station. For example, incremental redundancy permits unsuccessfully decoded sub-packets to be retransmitted and combined with the previously transmitted sub-packets to improve decoding success rate. Each of the retransmitted sub-packets includes a sub-packet identifier. A data rate identifier is used to inform the base station of the data rate that the mobile unit is using to transmit packets. In an EV-DO wireless communication system, the sub-packet identifier and the data rate identifier are encoded together and transmitted over the reverse rate indicator channel.

The number of bits used to transmit the reverse rate indicator may be relatively large (e.g., six or more bits) because of a reverse rate indicator includes information indicative of both the sub-packet identifier and the data rate identifier. Moreover, the transmitted bits are generally different for each retransmission. For example, when a sub-packet is transmitted, the associated reverse rate indicator bits may be 111111. If a re-transmission of the sub-packet is requested, then the sub-packet and the associated reverse rate indicator may be retransmitted. However, the sub-packet identifier associated with the re-transmitted sub-packet will be different than the sub-packet identifier associated with the original sub-packet so that the associated reverse rate indicator will also be different. For example, the reverse rate indicator associated with the re-transmitted sub-packet may be 1111(–1)(–1). Consequently, the reverse rate indicators associated with multiple re-transmitted sub-packets cannot be literally accumulated to improve the detection rate for the reverse rate indicator channel. Although the detection reliability of the reverse rate indicator may be improved by increasing the reverse rate indicator channel transmit power, the increased reverse rate channel indicator gain also increases the Rise-over-Thermal and therefore limits data throughput on the reverse link.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for detecting a reverse rate indicator channel. The method may include accessing first encoded information indicative of a data rate and a first sub-packet identifier associated with a sub-packet, accessing second encoded information indicative of the data rate and a second sub-packet identifier associated with the sub-packet, and modifying the second encoded information. The method may also include combining the first encoded information and the modified second encoded information, and decoding the combined first and modified second encoded information.

BRIEF DESCRIPTION OF THE DRAWINGS

The invention may be understood by reference to the following description taken in conjunction with the accompanying drawings, in which like reference numerals identify like elements, and in which.

Figure 1:
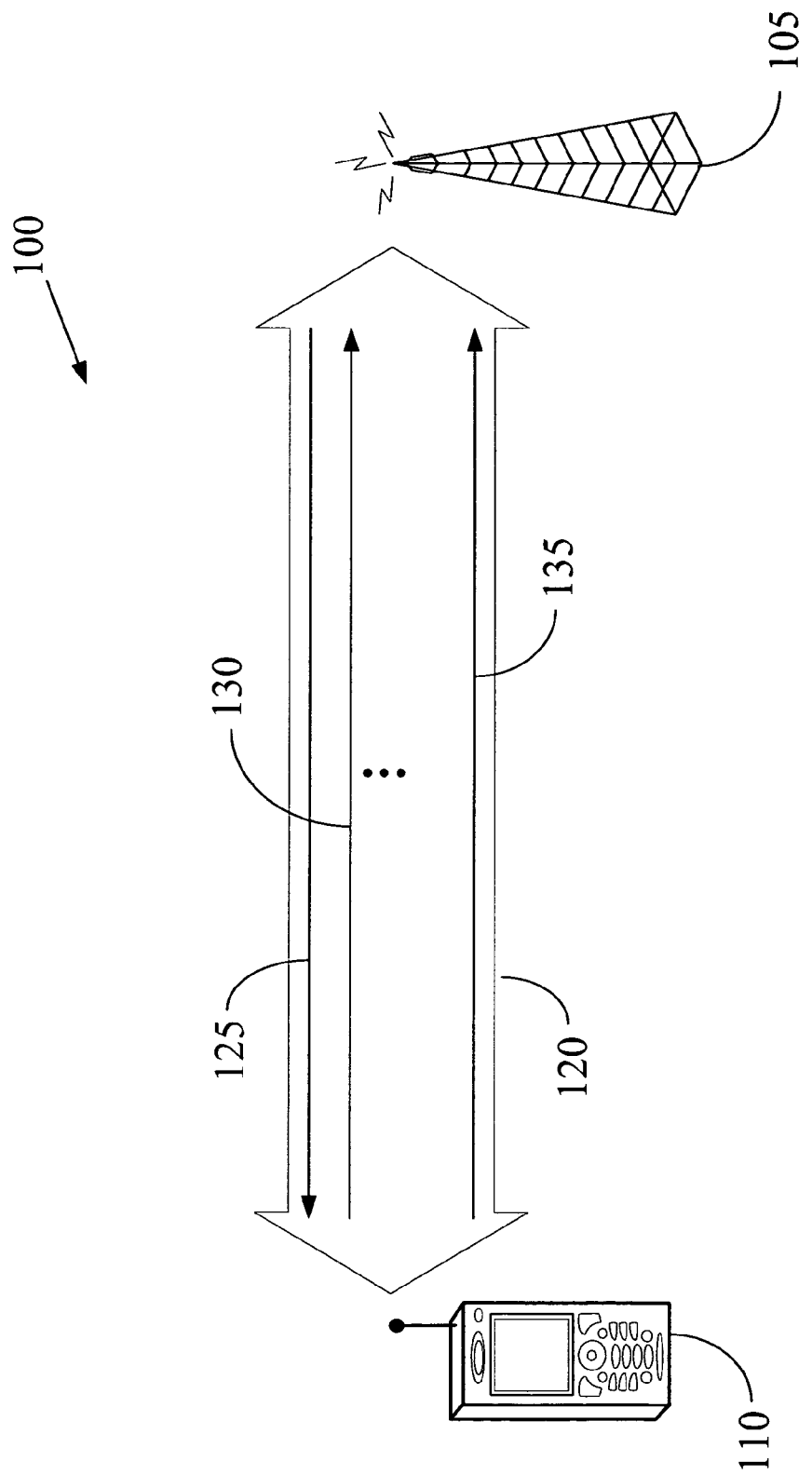
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a wireless communication system 100. In the illustrated embodiment, the wireless communication system 100 is an Evolution, Data-Optimized (EV-DO) wireless communication system 100 that combines features of CDMA and TDMA protocols to enhance overall system capacity. The wireless communication system 100 shown in FIG. 1 also implements incremental redundancy using the Hybrid Acknowledgment Request (H-ARQ) technique and multiple data transmission rates. However, persons of ordinary skill in the art having benefit of the present disclosure should appreciate that the present invention is not limited to EV-DO wireless communication systems 100 that implement H-ARQ and multiple data transmission rates. In alternative embodiment, the wireless communication system 100 may operate according to any other communication systems, standards, or protocols.

The wireless communication system 100 includes one or more base stations 105 for providing wireless connectivity to one or more mobile units 110. Persons of ordinary skill in the art having benefit of the present disclosure should appreciate that the present invention is not limited to providing wireless connectivity using base station 105. In alternative embodiments, other types of access point may be used to provide wireless connectivity in the wireless communication system 100. For example, wireless connectivity may be provided by base station routers, radio access networks, and the like. Persons of ordinary skill in the art should also appreciate that any type of mobile unit 110 may be implemented in the wireless communication system 100. For example, the mobile unit 110 may be a cellular telephone, a personal data assistant, a smart phone, a pager, a text messaging device, a network interface card, a notebook computer, a desktop computer, and the like.

The base station 105 and the mobile unit 110 may establish a wireless communication link 120 for exchanging information over the air interface. The wireless communication link 120 includes a plurality of wireless communication channels. In the illustrated embodiment, the wireless communication link 120 includes a downlink (or forward link) traffic channel 125 for transmitting data from the base station 105 to the mobile unit 110 and an uplink (or reverse link) traffic channel 130 for transmitting data from the mobile unit 110 to the base station 105. The wireless communication link 120 also includes a reverse rate indicator channel 135 for providing information indicative of a data transmission rate associated with sub-packets transmitted on the reverse link traffic channel 130 as well as other information such as a sub-packet ID that may be used to identify sub-packets that have been retransmitted, e.g., in response to a H-ARQ retransmission request. However, persons of ordinary skill in the art should appreciate that the present invention is not limited to the channels 125, 130, 135 shown in FIG. 1. In alternative embodiments, the wireless communication link 120 may include additional channels such as additional traffic channels, random access channels, paging channels, signaling channels, and the like.

In operation, the mobile unit 110 selects a transmission rate for transmitting a sub-packet including data on the reverse link traffic channel 130. For example, the mobile unit 110 may select a four-bit sequence 1111 indicative of the selected data transmission rate. The mobile unit 110 may also assign a sub-packet identifier to the sub-packet that is to be transmitted at the selected data transmission rate. For example, the mobile unit 110 may assign a two-bit sequence 00 as the sub-packet identifier of the sub-packet. However, persons of ordinary skill in the art should appreciate that the particular data transmission rate indicator and sub-packet identifiers described above are intended to be exemplary and not to limit the present invention.

The mobile unit 110 may then provide the information indicative of the selected data transmission rate and the sub-packet identifier over the reverse rate indicator channel 135. For example, the mobile unit 110 may interleave the bits of the indicator associated with the selected data transmission rate and the sub-packet identifier to form a single code word indicative of the selected data transmission rate and the sub-packet identifier. The mobile unit 110 may then encode the code word and transmits the encoded information over the reverse rate indicator channel 135. Techniques for forming and encoding code words, as well as for transmitting the encoded information over the air interface, are known to persons of ordinary skill in the art and in the interest of clarity only those aspects of these techniques that are relevant to the present invention will be discussed further herein.

The base station 105 may receive the encoded information over the reverse rate indicator channel 135 and may attempt to decode the received encoded information. If the reverse rate indicator channel 135 and the reverse link traffic channel 130 are both successfully decoded, then the base station 105 may provide an acknowledgment message and a new sub-packet may be transmitted. However, if the reverse rate indicator channel 135 is not successfully decoded, then the base station 105 may provide a negative acknowledgment message and request that the original sub-packet be retransmitted. Techniques for receiving and decoding encoded information, as well as for transmitting acknowledgment (or negative acknowledgment) messages over the air interface, are known to persons of ordinary skill in the art and in the interest of clarity only those aspects of these techniques that are relevant to the present invention will be discussed further herein.

The mobile unit 110 may then form a new code word including information indicative of the selected data transmission rate in response to the negative acknowledgment message and/or a request for retransmission of the original sub-packet. The retransmitted sub-packet may be assigned a new sub-packet identifier, e.g., the first sub-packet identifier may be incremented by 1 to 01. As discussed above, the mobile unit 110 may combine the information indicative of the selected data transmission rate and the new sub-packet identifier to form a new code word, e.g., by interleaving the bits of these identifiers. The mobile unit 110 may then encode the new code word and retransmit the encoded information over the reverse rate indicator channel 135.

The base station 105 may receive the encoded information indicative of the retransmitted selected data transmission rate and the new sub-packet identifier. The base station 105 may then modify the encoded information received in the retransmission. For example, as will be discussed in detail below, the base station 105 may modify the encoded information received in the retransmission so that this information may be coherently combined with the previously received encoded information. The previously received encoded information may then be combined with the newly received (and modified) encoded information and the base station 105 may attempt to decode the combined encoded information.

Figure 2:
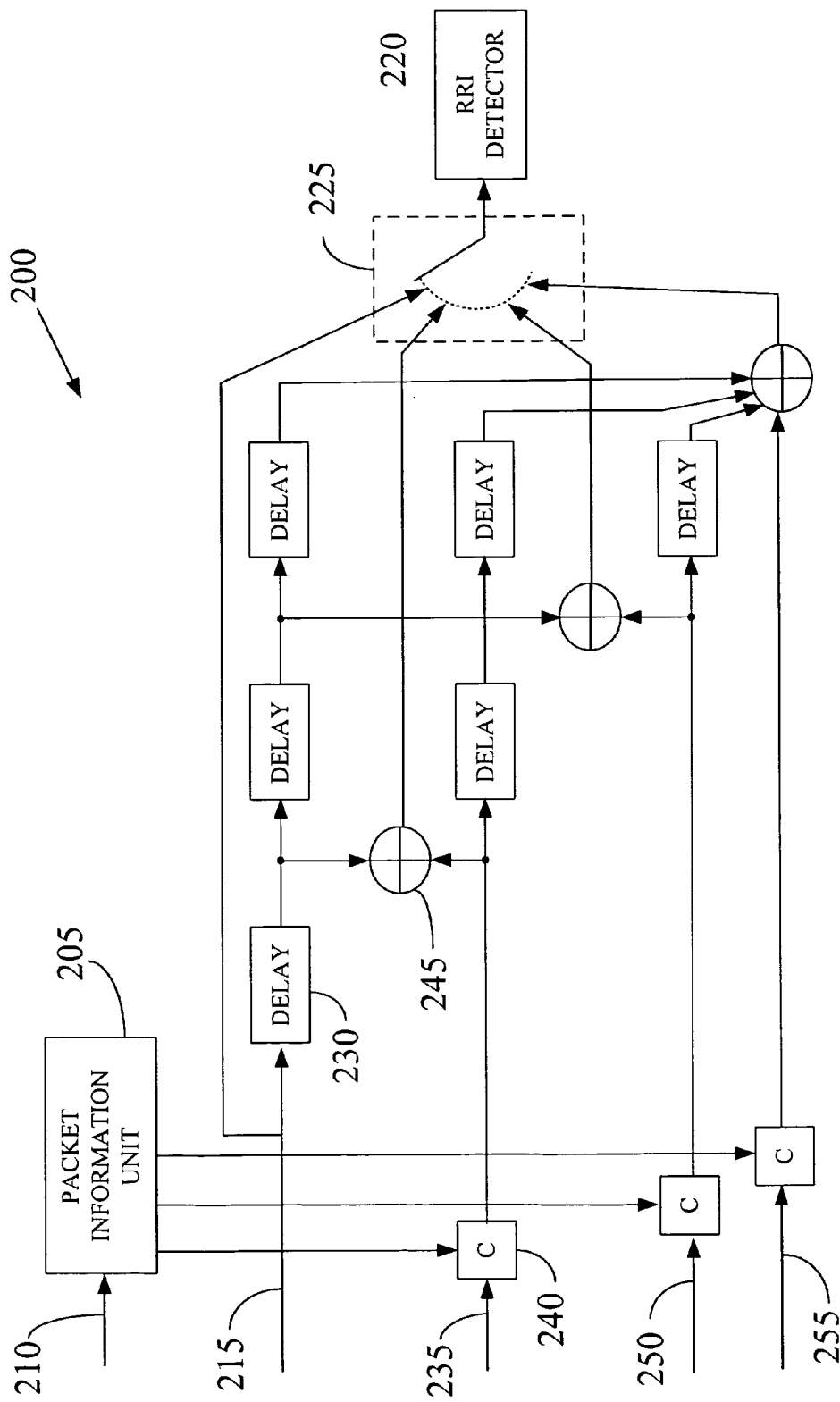
FIG. 2 conceptually illustrates one exemplary embodiment of a reverse rate indicator detection circuit, in accordance with the present invention.

FIG. 2 conceptually illustrates one exemplary embodiment of a reverse rate indicator detection circuit 200. In the illustrated embodiment, the circuit 200 includes a packet information unit 205 that may receive information indicating that a mobile unit is attempting to transmit a new packet or sub-packet, as indicated by the arrow 210. For example, the packet information unit 205 may receive information such as forward link acknowledgment information, information indicating the reverse rate indicator channel modulation and/or coding techniques (e.g. the modulation and/or coding techniques used for the selected data transmission rate information and/or the sub-packet identifier), and the like. Encoded information transmitted over the reverse rate indicator channel may be received by the circuit 200, as indicated by the arrow 215, and may be provided to a reverse rate indicator detector 220 via a switch 225. The encoded information may also be provided to a delay unit 230 (only one indicated in FIG. 2), which may be implemented as a register, a buffer, or any other combination of hardware, firmware, and/or software.

The reverse rate indicator detector 220 may attempt to decode the encoded information 215. If the encoded information 215 is successfully decoded, then this information may be used to attempt to decode the sub-packet transmitted over a traffic channel. However, if the reverse rate indicator detector 220 does not successfully decode the encoded information 215, a retransmission may be requested and the encoded information provided by the mobile unit in response to the retransmission request may be provided to the circuit 200, as indicated by the arrow 235. The encoded information 235 is provided to a coding element 240 (only one indicated in FIG. 2), which is configured to modify the encoded information 235 using information provided by the packet information unit 205.

In the illustrated embodiment, the coding element 240 uses the information indicative of the sub-packet modulation and/or coding techniques, as well as knowledge of the incremental increase of the sub-packet identifier, to modify the encoded information 235 so that it may be coherently combined with the encoded information 215. For example, the coding element 240 may determine the value of the sub-packet identifier associated with the encoded information 235. The coding element 240 may then convert the encoded information 235 using the information indicative of the sub-packet modulation and/or coding techniques and the determined value of the sub-packet identifier. The information associated with the data transmission rate may then be separated from the information indicative of the sub-packet identifier and the information associated with the data transmission rate may be re-encoded using the value of the sub-packet identifier associated with the encoded information 215.

The modified encoded information 235 may be provided to an accumulator 245 (only one depicted in FIG. 2), which may combine the modified encoded information 235 with the delayed encoded information 215. Since the modified encoded information 235 has been encoded using the value of the sub-packet identifier associated with the encoded information 215, the modified encoded information 235 and the delayed encoded information 215 may be coherently combined by the accumulator 245. The accumulated encoded information may then be provided to the reverse rate indicator detector 220, which may attempt to decode the combined encoded information. If the combined encoded information is successfully decoded, then this information may be used to attempt to decode the associated sub-packet transmitted over the traffic channel. However, if the reverse rate indicator detector 220 does not successfully decode the combined encoded information, a retransmission may be requested and the encoded information provided by the mobile unit in response to the retransmission request may be provided to the circuit 200, as indicated by the arrow 250.

The encoded information 250 is provided to a coding element that is configured to modify the encoded information 250 using information provided by the packet information unit 205, as discussed in detail above. The modified encoded information 250 may be provided to an accumulator that may combine the modified encoded information 250 with the delayed encoded information 235 and the twice-delayed encoded information 215. The accumulated encoded information may then be provided to the reverse rate indicator detector 220, which may attempt to decode the combined encoded information. If the combined encoded information is successfully decoded, then this information may be used to attempt to decode the associated sub-packet transmitted over the traffic channel. However, if the reverse rate indicator detector 220 does not successfully decode the combined encoded information, another retransmission may be requested and the encoded information provided by the mobile unit in response to the retransmission request may be provided to the circuit 200, as indicated by the arrow 255.

The encoded information 255 may be modified and provided to an accumulator to be combined with the delayed modified encoded information 250, the twice-delayed modified encoded information 235, and the thrice-delayed modified encoded information 215, as discussed above. The accumulated encoded information may then be provided to the reverse rate indicator detector 220, which may attempt to decode the combined encoded information. If the combined encoded information is successfully decoded, then this information may be used to attempt to decode the associated sub-packet transmitted over the traffic channel. In the illustrated embodiment, if the reverse rate indicator detector 220 does not successfully decode the combined encoded information after the third retransmission, the sub-packet may be dropped. However, persons of ordinary skill in the art having benefit of the present disclosure should appreciate that the total number of retransmissions permitted before dropping the sub-packet is a matter of design choice and not material to the present invention.

Figure 3:
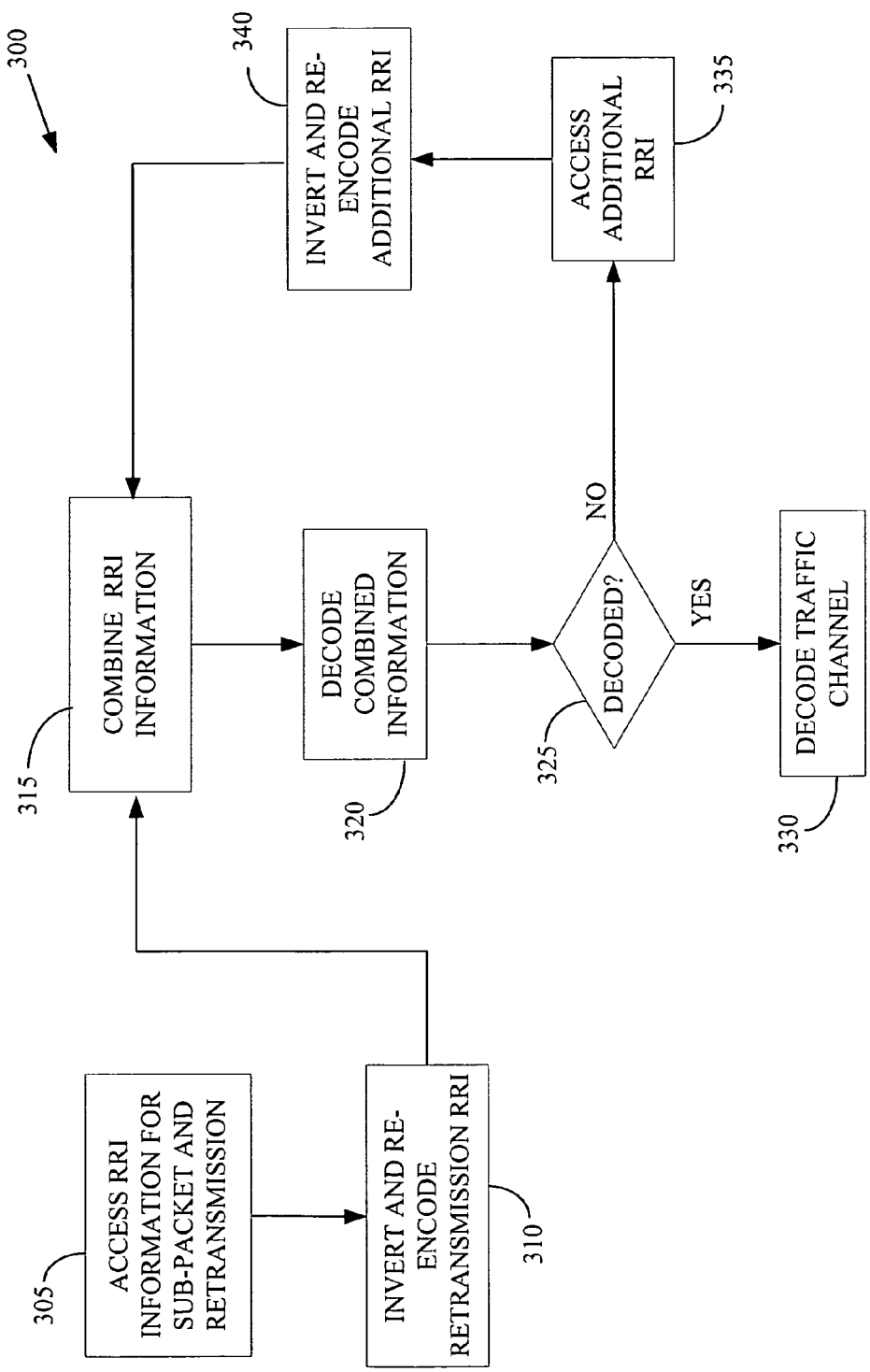
FIG. 3 conceptually illustrates one exemplary embodiment of a method of coherently combining information indicative of a reverse rate indicator, in accordance with the present invention.

FIG. 3 conceptually illustrates one exemplary embodiment of a method 300 of coherently combining information indicative of a reverse rate indicator. In the illustrated embodiment, reverse rate indicator information associated with a sub-packet is accessed (at 305). Reverse rate indicator information associated with a retransmission of the sub-packet is also accessed (at 305). For example, reverse rate indicator information may be received via a reverse rate indicator channel as discussed above and may be stored or buffered in a register or a memory location. The reverse rate indicator information may then be accessed (at 305) from the register or the memory location. The reverse rate indicator information associated with the retransmitted sub-packet may then be converted and re-encoded (at 310) using information associated with the sub-packet, as described in detail above. The modified reverse rate indicator information associated with the retransmitted sub-packet may then be combined (at 315) with the reverse rate indicator information associated with the original sub-packet. In one embodiment, the reverse rate indicator information is combined (at 315) coherently.

A decode (at 320) of the combined information may be attempted. If the combined information is successfully decoded (at 325), then the decoded reverse rate indicator information may be used to attempt to decode (at 330) a traffic channel carrying the sub-packet. If the combined information is not successfully decoded (at 325), then reverse rate indicator information associated with one or more subsequent retransmissions of the reverse rate indicator information may be accessed (at 335). The reverse rate indicator information associated with each of the retransmitted sub-packets may then be converted and re-encoded (at 340) using information associated with the sub-packet, as described in detail above. The modified reverse rate indicator information associated with the retransmitted sub-packet may then be combined (at 315) with the previously received reverse rate indicator information associated with the sub-packet and a decode of the combined information may be attempted (at 320). This iterative procedure may proceed until the information is successfully decoded (at 320) or until an upper limit on the number of retransmissions has been reached.

Modifying the received reverse rate indicator information so that retransmissions of this information may be combined coherently may significantly improve detection performance of the reverse rate indicator channel. Improving the detection performance of this channel may be especially important for low data rate traffic such as Voice over Internet Protocol (VoIP) transmissions in which packets typically need three to four transmissions before they are successfully decoded. The channel overhead associated with the reverse rate indicator channel may be significant if there are a relatively large number of users being served by each base station and so reducing the number of retransmissions required to decode this channel may significantly improve the performance of the wireless communication system. Moreover, the channel gain of the reverse rate indicator channel may be reduced during retransmissions so that the total interference within the sector served by the base station may be reduced.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    accessing, at a receiver, first encoded information indicative of a data rate for transmission of a sub-packet and a first sub-packet identifier associated with the sub-packet;
    accessing, at the receiver, second encoded information indicative of the data rate and a second sub-packet identifier associated with the sub-packet, the second encoded information having been received subsequent to the first encoded information in response to a request to re-transmit the sub-packet;
    separating, at the receiver, the second encoded information into data rate information indicative of the data rate and sub-packet identifier information indicative of the second sub-packet identifier;
    forming modified second encoded information by encoding a combination of:

the data rate information separated from the second encoded information, and information indicative of the first sub-packet identifier;

forming, at the receiver, third encoded information based on the first encoded information and the modified second encoded information; and decoding, at the receiver, the third encoded information to determine the data rate used to decode the sub-packet.

2. The method of claim 1, wherein forming third encoded information comprises combining the first encoded information and the modified second encoded information.

3. The method of claim 1, wherein accessing the first encoded information comprises accessing a reverse rate indicator signal associated with the sub-packet.

4. The method of claim 1, wherein accessing the second encoded information comprises accessing a reverse rate indicator signal associated with a retransmission of the sub-packet over the second reverse channel.

5. The method of claim 1, wherein modifying the second encoded information comprises receiving information indicative of a code structure of the second encoded information.

6. The method of claim 5, wherein modifying the second encoded information comprises converting the second encoded information based on the code structure and the second sub-packet identifier.

7. The method of claim 6, wherein modifying the second encoded information comprises forming fourth encoded information based on the converted second encoded information and the first sub-packet identifier.

8. The method of claim 7, wherein combining the first encoded information and the modified second encoded information comprises coherently combining the first encoded information and the fourth encoded information.

9. The method of claim 8, wherein combining the first encoded information and the fourth encoded information comprises delaying the first encoded information and combining the delayed first encoded information and the fourth encoded information.

10. The method of claim 1, comprising determining whether decoding of the combined first and modified second encoded information was successful.

11. The method of claim 10, comprising decoding the sub-packet transmitted over the second reverse channel based on the decoded data rate in response to determining that decoding of the combined first and modified second encoded information was successful.

12. The method of claim 10, comprising accessing at least one fifth encoded information indicative of the data rate and at least one fifth sub-packet identifier associated with the sub-packet in response to determining that decoding of the combined first and modified second encoded information was not successful, said at least one fifth encoded information being received over the first reverse channel.

13. The method of claim 12, comprising:

modifying said at least one fifth encoded information by separating the information indicative of the data rate from the information indicative of the fifth sub-packet identifier in the fifth encoded information and re-encoding the information indicative of the data rate with information indicative of the first sub-packet packet identifier;

combining the first encoded information, the modified second encoded information, and said at least one modified fifth encoded information; and decoding the combined first, modified second, and at least one modified fifth encoded information.

14. The method of claim 13, comprising determining whether decoding of the combined first, modified second, and at least one modified fifth encoded information was successful.

15. The method of claim 14, comprising decoding at least one traffic channel based on the decoded data rate in response to determining that decoding of the combined first, modified second, and at least one modified fifth encoded information was successful.

16. A method, comprising:

receiving, at a base station over a first reverse channel from a mobile unit, first encoded information indicating a first sub-packet identifier and a data rate used to encode a sub-packet at the mobile unit;

separating the encoded information indicating the data rate from the encoded information indicating the first sub-packet identifier: and coherently combining, at the base station, the encoded information indicating the data rate with previously received encoded information indicating the data rate used to encode the sub-packet at the mobile unit.

17. The method of claim 16, wherein coherently combining the encoded information with the previously received encoded information comprises delaying the previously received encoded information so that the encoded information can be coherently combined with the previously received encoded information.

18. The method of claim 17, wherein coherently combining the encoded information with the previously received encoded information comprises re-encoding the information indicating the data rate with information indicating a previously received sub-packet identifier.

19. The method of claim 18, wherein re-encoding the information indicating the data rate with information indicating the previously received sub-packet identifier comprises determining a value of the previously received sub-packet identifier based on knowledge of the incremental increase of sub-packet identifiers.

20. The method of claim 16, comprising decoding the coherent combination of the encoded information indicating the data rate and the previously received encoded information indicating the data rate.

* * * * *